United States Patent [19]

Tokuda

[11] Patent Number: 4,970,542
[45] Date of Patent: Nov. 13, 1990

[54] METHOD OF DETERMINING EXPOSURES

[75] Inventor: Kanji Tokuda, Kanagawa, Japan

[73] Assignee: Fuji Photo Film Co., Ltd., Kanagawa, Japan

[21] Appl. No.: 475,532

[22] Filed: Feb. 6, 1990

[30] Foreign Application Priority Data

Feb. 7, 1989 [JP] Japan ............................ 1-28222

[51] Int. Cl.⁵ .............................................. G03B 27/80
[52] U.S. Cl. ........................................ 355/38; 355/77
[58] Field of Search ............................. 355/38, 68, 77

[56] References Cited

U.S. PATENT DOCUMENTS 4,888,612 12/1989 Yamamoto ...................... 355/38 X Primary Examiner—L. T. Hix
Assistant Examiner—D. Rutledge
Attorney, Agent, or Firm—Sughrue, Mion, Zinn, Macpeak & Seas

[57] ABSTRACT

A calculation for correcting the exposure of any one of three colors in either a first system or a second system is used to influence the exposures of the other colors in the same system as to determine the exposures. The first system includes a lightsensitive material and an exposure system in which a color mixture is present in the vicinity of at least one boundary of the three colors and which is adapted to effect a calculation for correcting the exposure of the three colors respectively and independently. The second system includes a lightsensitive material and an exposure system in which an amount of color mixture is less than that of said first system and which is adapted to effect a calculation for correcting the exposures of the three colors respectively and independently. Hence, the tendency of color correction in the first and second systems can be made identical, thereby making uniform the operation of the operator when exposure systems and lightsensitive materials in which the degree of color mixture differ are used.

18 Claims, 2 Drawing Sheets

FIRST PRINTER	SECOND PRINTER

METHOD OF DETERMINING EXPOSURES

BACKGROUND OF THE INVENTION

1. Field of the Invention

The present invention relates to a method of determining exposures, and more particularly to a method of determining exposures when a color printer having different functions and lightsensitive materials having different characteristics are used in conjunction.

2. Description of the Related Art

In a white-color subtractive color printer, light which has been transmitted through a negative film from a light source is measured by using photometers for blue (B), green (G), and red (R), and cut-filters (i.e. color compensating filters) of yellow (Y), magenta (M), cyan (C) are inserted into an optical path in response to output signals from the photometers, thereby automatically controlling the respective exposures of B-, G-, and R-sensitive layers of color paper. This type of color printer is provided with a correcting function for manually correcting exposures in automatic exposure control. The manual correction of exposures is effected by operating four keys, a D key for correcting the density of the overall picture, a Y key for correcting the density of Y, an M key for correcting the density of M, and a C key for correcting the density of C. In a correcting section of a printer, actual exposure $E_R$, $E_G$, $E_B$ are calculated in accordance with the following Formula (1):

$$\left. \begin{array}{l} \log E_R = \log E_{RO} + I_C \cdot K_C + I_{DC} \cdot K_D \\ \log E_G = \log E_{GO} + I_M \cdot K_M + I_{DM} \cdot K_D \\ \log E_B = \log E_{BO} + I_Y \cdot K_Y + I_{DY} \cdot K_D \end{array} \right\} \quad (1)$$

where $E_{RO}$, $E_{GO}$, and $E_{BO}$ represent exposures of the three colors calculated by an automatic exposure control function on the basis of information on the negative (e.g., cumulative transmission density) measured by the photometers; $I_C$, $I_M$, and $I_Y$ represent amounts of variation per stage of the C key, M key, and Y key (color keys); $I_{DC}$, $I_{DM}$, and $I_{DY}$ represent amounts of variation per stage of the D key; and $K_C$, $K_M$, $K_Y$, and $K_D$ represent values of the respective keys.

As can be understood from the above Formula (1), correcting calculations based o the operation of the C, M, and Y keys are respectively independent of the exposures of the three colors, and the operation of the key of any particular color exerts n influence on the exposures of the other colors. Accordingly, the variations of density of the printer in a case where the Y density is varied by operating only the Y key using a conditions-setting negative (a so-called Bull's eye or the like) in the above-described printer should become like those shown in FIG. 1. The abscissa of FIG. 1 represents a value (the number of stages) of the key, N denotes 0 (no correction), and A, B, C, and D denote −1, −2, −3, and −4, respectively. If the value of the key is altered by one stage, the exposure changes by an amount set in a 10–20% range.

However, spectral characteristics of the aforementioned cut-filters for exposures are considerably different from ideal spectral characteristics, so that one of the B, G, and R color components cannot be completely cut by a relevant cut-filter and, at the same time, the other color components are also cut by the same cut-filter by a considerable degree. In other words, these cut-filters constitute an exposure system in which a color mixture is present. In addition, although the boundaries of spectral sensitivity between the G-sensitive layer and R-sensitive layer of color paper are completely separated, the spectral sensitivity of the B-sensitive layer and that of the G-sensitive layer slightly overlap with each other (i.e., a color mixture takes place) in the vicinity of 550 nm. Furthermore, in the spectral characteristics of a color film, an overlapping is observed between the color-sensitive layers. Meanwhile, color separation filters for B, G, and R of an exposure system used in an integrating additive exposure type color printer provide characteristics close to theoretical values, so that these color separation filters make it possible to arrange an exposure system in which a color mixture is practically nil. Thus, since the spectral characteristics of cut-filters or color separation filters, the spectral sensitivity and color density of color paper, and the spectral density of a negative are not uniform, when the value of the Y key is varied as described above, the densities of M and C of a print also actually change, as shown in FIG. 2. Accordingly, as a result of operating the Y key, the operator is accustomed to the fact that the densities of M, Y, and C vary as shown in FIG. 2. This also holds true for the operation of the M and C keys.

In recent years, in order to improve the hues of color paper, attempts have been made to decrease the mixing of colors and improve processing by making improvements on lightsensitive materials and the exposure systems of printers. Thanks to these improvements, the variation of density of each color by the operation of the Y key becomes like the one shown in FIG. 3, and the degree of influence exerted on the other colors is reduced. However, in a case where an improved color printer and a conventional color printer are used in conjunction, there is a problem in that since the operator is not accustomed to the operation of the improved color printer, he or she frequently operates the improved color printer with the same feeling as that with which he or she operates the conventional color printer, so that prints whose hues are utterly different from the estimated hues are produced in large numbers. In addition, there is an additional problem in that since the conventional color printer and the improved color printer are operated with the same feeling, the hues of prints produced by these color printers differ from each other or vary. Furthermore, in order to solve these problems, it is necessary to deliberately make the operation of the conventional color printer different from the operation of the improved color printer, giving rise to the problem of deteriorated operating efficiency. These problems similarly occur when improvements are made on the lightsensitive materials without improving the color printer.

SUMMARY OF THE INVENTION

Accordingly, an object of the present invention is to provide a method of determining an exposure which, in cases where improvements have been made on the functions of a color printer and the characteristics of a lightsensitive material, makes it possible to determine exposures by operating color keys with the same feeling as that experienced before the improvement.

To this end, in accordance with the present invention, there is provided a method of determining exposures characterized in that when a determination is made of an exposure of a first system in which a color mixture is present in the vicinity of at least one boundary of three colors and which is adapted to effect a calculation for correcting the exposures of the three colors respectively and independently, and the exposure of a second system in which an amount of color mixture is less than that of the first system and which is adapted to effect a calculation for correcting the exposures of the three colors, any one of the calculations for correcting the exposures of the three colors in the first system or the second system is used to influence the exposures of the other colors in the same system so as to determine the exposures.

In the above-described arrangement, the first system can be provided with at least either one of an exposure system in which the color mixture is present, and a lightsensitive material in which the color mixture is present, while the second system can be provided with at least one of an exposure system in which an amount of color mixture is less than that of the first system, and a lightsensitive material in which an amount of color mixture is less than that of the lightsensitive material of the first system.

In addition, at the time when the calculation for correction is used to influence the exposures, the degree of influence can be gradually varied.

Furthermore, at the time when the calculation for correction is used to influence the exposures, it is possible to prepare two or more type of ways of correction with different degrees of influence and select a desirable one. At this time, it is possible to select a way of correction in correspondence with a method of printing from a film onto photographic paper.

In the first system, a color mixture is present in the vicinity of at least one boundary of the three colors (e.g., in the vicinity of a boundary between B and G), and in the second system the amount of color mixture is less than that of the first system. Thus, since the degrees of color mixture varies between the first and second system, the tendencies of color compensation of prints prepared by effecting exposure control with calculations for independently correcting the exposures of the three colors made identical for the first and second systems which differ from each other, so that the operating feeling when the first system and the second system are used in conjunction would differ from that of the case where they are not.

Accordingly, any one of the calculations for correcting the exposures of the three colors in the first system or the second system is used to influence the exposures of the other colors in the same system. As a result, the tendencies of color correction of the first and second systems can be made identical.

It is also possible to provide an arrangement in which the first system is provided with at least either one of a first exposure system in which the color mixture is present and a first lightsensitive material in which the color mixture is present, while the second system is provided with at least either one of a second exposure system in which an amount of color mixture is less than that of the first exposure system and a second lightsensitive material in which an amount of color mixture is less than that of the first lightsensitive material, thereby making the second system different from the first system. The following combinations of the first system and the second system, thus arranged, are possible. Firstly, it is possible to cite a combination of an exposure system in which a color mixture is present and an exposure system in which an amount of color mixture is less than that of the exposure system of the first system, and, with respect to the lightsensitive material, the degrees of color mixture may be either identical or different. For instance, as examples of this combination it is possible to cite a combination of a conventional white-light subtractive color printer and a conventional additive color printer, and a combination of a conventional white-light subtractive color printer and a white-light subtractive color printer in which improvements have been made on the color mixture of cut-filters. Secondly, it is possible to cite a combination of a light-sensitive material in which the color mixture is present and a lightsensitive material in which an amount of color mixture is less than that of the lightsensitive material of the first system, and the degree of color mixture of the exposure systems may be either identical or different. For instance, falling under the category of this combination is that of conventional color paper and color paper on which improvements have been made so that the amount of color mixture between the B-sensitive layer and the G-sensitive layer is reduced.

When the calculation for correction is used to influence the exposures, it is possible to gradually vary the degree of influence. The varying of the degree of influence in this manner allows the operator to become gradually accustomed to the use of a printer with an improved exposure system or a lightsensitive material with improved characteristics.

In addition, when the calculation for correction is used to influence the exposure, if two or more different ways of correction with different degrees of influence are prepared and are selectively used, when an operator who is accustomed to a printer with an improved exposure system and a lightsensitive material with improved characteristics, or an operator who is unaccustomed to the same are engaged with the operation, it is possible to cope with cases where automatic exposure correction is carried out and cases where manual exposure correction is carried out. In addition, by selecting a method of correction having a different degree of influence depending on cases where an exposure is effected from a film onto photographic paper and cases where an exposure is effected on positive photographic paper (reversal paper), it is possible to determine exposures with the same feeling as that conventionally experienced, irrespective of the printing method.

As described above, in accordance with the present invention, since a calculation for correcting the exposure of one color is used to influence the exposure of the other colors so as to determine the exposures, it is possible to obtain the advantage that the printer can be used with the same feeling as the one conventionally experienced, when printers and lightsensitive materials with different degrees of color mixture are used in conjunction.

The above and other objects, features, and advantages of the invention will become more apparent from the following detailed description of the invention when read in conjunction with the accompanying drawings.

DESCRIPTION OF THE PREFERRED EMBODIMENT

Figure 4:
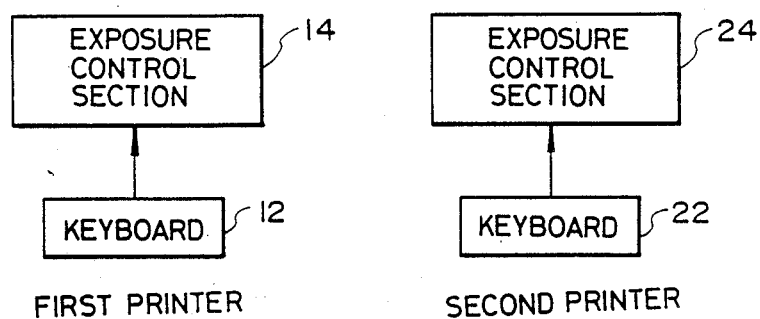
FIG. 4 is a block diagram of a color printer embodying the present invention.

Referring now to the accompanying drawings, a detailed description will be given of an embodiment of the present invention. In this embodiment, the present invention is applied to cases where two color printers shown in FIG. 4 are used in conjunction. A first printer comprises a keyboard 12 having keys D, C, B, A, N, 1, 2, 3, 4, 5, Y, M, and C, as well as an exposure control section 14 having a light source, cut-filters of Y, M, and C, photometers, an exposure calculating section, etc. and adapted to control an exposure of color paper. A second printer comprises a keyboard 22 having keys similar to those of the keyboard 12, as well as an exposure control section 24 having a light source, cut-filters whereby a color mixture of Y, M, and C is prevented, photometers, and an exposure calculating section, etc. and adapted to control an exposure of color paper.

Figure 1:
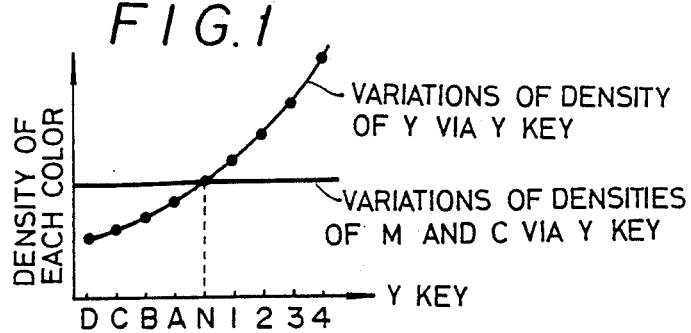
FIGS. 1, 2, and 3 are graphs illustrating the relationships between values of a Y key and the density of each color, respectively.
Figure 2:
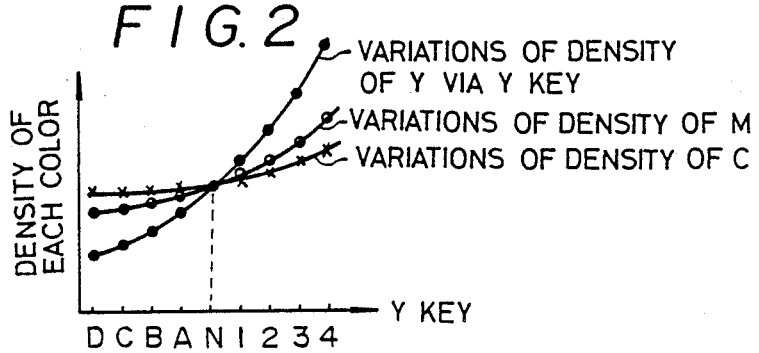

The exposure calculating section of the first printer 10 calculates exposures $E_R$, $E_G$, $E_B$ of the three colors in accordance with the above-described Formula (1). Variations of the density of each color by the operation of the Y key of the first printer are shown in FIG. 2.

The cut-filters of the second printer have been improved to prevent a color mixture, so that the exposure calculating section of the second printer calculates the exposures $E_R$, $E_G$, $E_B$ in accordance with Formula (2) which will be described below.

$$\begin{aligned} \log E_R = \log E_{RO} &+ I_{CC} \cdot K_C + I_{CM} \cdot K_M \\ &+ I_{CY} \cdot K_Y + I_{DC} \cdot K_D \\ \log E_G = \log E_{GO} &+ I_{MC} \cdot K_C + I_{MM} \cdot K_M \\ &+ I_{MY} \cdot K_Y + I_{DM} \cdot K_D \\ \log E_B = \log E_{BO} &+ I_{YC} \cdot K_C + I_{YM} \cdot K_M \\ &+ I_{YY} \cdot K_Y + I_{DY} \cdot K_D \end{aligned} \quad (2)$$

I formula (2) above is expressed by a determinant, we have $$\begin{pmatrix} \log E_R \\ \log E_G \\ \log E_B \end{pmatrix} = \begin{pmatrix} \log E_{RO} \\ \log E_{GO} \\ \log E_{BO} \end{pmatrix} + \begin{pmatrix} I_{CC} & I_{CM} & I_{CY} \\ I_{MC} & I_{MM} & I_{MY} \\ I_{YC} & I_{YM} & I_{YY} \end{pmatrix} \begin{pmatrix} K_C \\ K_M \\ K_Y \end{pmatrix} + \begin{pmatrix} I_{DC} \\ I_{DM} \\ I_{DY} \end{pmatrix} \cdot K_D \quad (3)$$

where $I_{CM}$, $I_{CY}$, $I_{MC}$, $I_{MY}$, $I_{YC}$, $I_{YM}$, $I_{CC}$, $I_{MM}$, $I_{YY}$ represent amounts of variation per stage of a color key in a similar manner to $I_C$, $I_M$, and $I_Y$ of Formula (1).

If all the elements of the following matrix (4) of the aforementioned Formula (3) other than diagonal elements are set to 0, the Formula (3) becomes similar to Formula (1).

$$\begin{pmatrix} I_{CC} & I_{CM} & I_{CY} \\ I_{MC} & I_{MM} & I_{MY} \\ I_{YC} & I_{YM} & I_{YY} \end{pmatrix} \quad (4)$$

Figure 3:
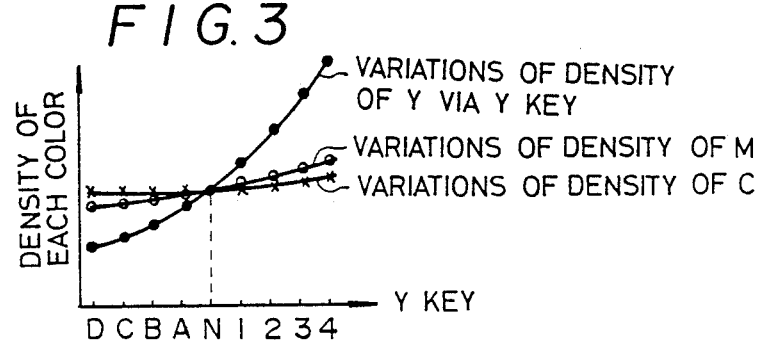

In other words, conditions are provided such that $I_{CM}$, $I_{CY}$, $I_{MC}$, $I_{MY}$, $I_{YC}$ assume specific finite values (excluding the case where all of $I_{CM}$, ..., $I_{YM}$ are 0s). If exposures are calculated for the second printer in accordance with the aforementioned Formula (1), since a color mixture has been improved, variations of density of each color using the Y key becomes like those shown in FIG. 3. However, if exposure control is effected by calculating the exposures in accordance with the aforementioned Formula (2), variations of density become like those shown in FIG. 2 in the same way as the variations of the density of the first printer since correction by means of the Y key influence the other colors as well. Accordingly, the tendencies of color correction become equal for both of the printers, with the result that it becomes possible to determine exposures and effect exposure control by correcting the exposure with the same feeling.

Since the second printer is essentially arranged such that exposures are calculated in accordance with a formula (a formula in which elements other than diagonal elements in the matrix of Formula (4) are set to 0) which is similar to the aforementioned Formula (1), when only the second printer is used by an operator who is accustomed to the operation of the first printer, a setting is provided such that exposures are calculated in accordance with the aforementioned Formula (2) in an early stage, and as he or she becomes accustomed to the operation, the elements other than diagonal elements in the aforementioned Formula (4) are gradually varied up to 0, thereby allowing the operator to become gradually accustomed to the operation of the second printer. Conversely, in cases where an operator who is accustomed to the operation of the second printer is made to become accustomed to the operation of the first printer, it suffices if exposures are calculated in the exposure calculating section of the second printer in accordance with Formula (3) in which the elements other than the diagonal elements in the matrix of the aforementioned Formula (4) are set to negative values. If this arrangement is provided, an operating feeling becomes identical with respect to a gray negative (e.g., a conditions-setting Bull's eye).

In addition, there is no need to take the difference in the operating feeling into consideration in a case where Formula (3) uses diagonal matrices (shown in Formula (5) below) in which the elements other than the diagonal elements of Formulae (3) and (4) above are set to 0, i.e., a formula corresponding to Formula (1) above and a formula corresponding to Formula (2) above are stored in advance in the exposure calculating section of the second printer so as to automatically correct exposures calculated on the basis of information on the negative obtained by the photometers. Accordingly, in this case, exposures may be determined by selecting Formula (3) using the matrix of Formula (5), while in a case where exposures are corrected manually, exposures may be determined by selecting Formula (3) by taking the difference in the operating feeling into consideration.

$$\begin{pmatrix} I_{CC} & 0 & 0 \\ 0 & I_{MM} & 0 \\ 0 & 0 & I_{YY} \end{pmatrix} \quad (5)$$

Furthermore, it also suffices if two formulae are stored in advance in the exposure calculating section, as described above, and in a case where an operator who is accustomed to the operation of the second printer effects the operation, Formula (3) using the matrix of Formula (5) may be selected to determine exposures, while in a case where an operator who is unaccustomed to the operation of the second printer effects the operation, Formula (3) may be selected to determine the exposures.

Furthermore, it also suffices if Formula (3) using the matrix of Formula (5) above and Formula (3) using Formula (6) below are stored in advance in the exposure calculating section, and in a case where color photographic paper is used, Formula (3) using the matrix of Formula (5) may be selected to determine the exposures, while in a case where positive -photographic paper is used, Formula (3) using the matrix of Formula (6) may be selected to determine the exposures.

$$\begin{pmatrix} 0 & -I_{CC}/2 & -I_{CC}/2 \\ -I_{MM}/2 & 0 & -I_{MM}/2 \\ -I_{YY}/2 & -I_{YY}/2 & 0 \end{pmatrix} \quad (6)$$

Although a description has been given by assuming the elements of the matrix of Formula (4) above to be fixed values, the elements may be set as functions, as shown in Formula (7) below.

$$\begin{pmatrix} p \cdot I_{CC}(K_C) & p \cdot I_{CM}(K_M) & p \cdot I_{CY}(K_Y) \\ q \cdot I_{MC}(K_C) & q \cdot I_{MM}(K_M) & q \cdot I_{MY}(K_Y) \\ r \cdot I_{YC}(K_C) & r \cdot I_{YM}(K_M) & r \cdot I_{YY}(K_Y) \end{pmatrix} \quad (7)$$

where p, q, and r denote coefficients represented by $1/K_C$, $1/K_M$, and $1/K_Y$, respectively.

An exposure calculation formula using the matrix of the above-mentioned Formula (7) becomes like the one shown below.

$$\begin{aligned} \log E_R &= \log E_{RO} + I_{CC}(K_C) + I_{CM}(K_M) + I_{CY}(K_Y) + I_{DC} \cdot K_D \\ \log E_G &= \log E_{GO} + I_{MC}(K_C) + I_{MM}(K_M) + I_{MY}(K_Y) + I_{DM} \cdot K_D \\ \log E_B &= \log E_{BO} + I_{YC}(K_C) + I_{YM}(K_M) + I_{YY}(K_Y) + I_{DY} \cdot K_D \end{aligned} \quad (8)$$

For instance, $I_{CC}(K_c)$ is a function of $K_c$ and can be set as in the following Table 1.

TABLE 1

When $K_c = 10$, $I_{cc}(K_c) = 0.4900$
When $K_c = 9$, $I_{cc}(K_c) = 0.4140$
When $K_c = 8$, $I_{cc}(K_c) = 0.3786$
..
..
..

TABLE 1-continued

When $K_c = 2$, $I_{cc}(K_c) = 0.0848$
When $K_c = 1$, $I_{cc}(K_c) = 0.0414$
When $K_c = 0$, $I_{cc}(K_c) = 0$
When $K_c = -1$, $I_{cc}(K_c) = -0.0414$
..
..
When $K_c = -9$, $I_{cc}(K_c) = -1.4140$
When $K_c = -10$, $I_{cc}(K_c) = -0.4500$ Thus, by varying the values of the elements in correspondence with the value of the color key with the elements of the matrix set as functions, it is possible to provide optimum variations even when the characteristics of the color paper are nonlinear.

It should be noted that although in the foregoing embodiment a description has been given by citing a case in which there is a difference in color mixture in the exposure system of the printer, the present invention is applicable to cases where there is a difference in color mixture in a lightsensitive material such as photographic paper.

As described above, in accordance with this embodiment, since the degree of correction by means of color keys can be made substantially identical in systems having different color mixtures, even in cases where improvements have been made on the color mixture of lightsensitive materials and the exposure systems of printers, it is possible to correct exposures with the same operating feeling as the one experienced before the improvement. For this reason, the setting of conditions for the printer by the operation of color keys can be effected in the same way as before, and the manual correction printing yield can be increased even at an early stage of use. In addition, by gradually varying the degree of correction, it is possible to allow the operator to become accustomed to a new tendency of correction, and it is possible to obtain optimum prints in respective modes by selecting the manner of correction.

The present invention is effective in setting conditions since variations in the hues of a negative of a principally gray color, such as a Bull's eye, by the operation of the color keys ca be made to conform with variations experienced before the improvements were made. However, this invention is not able to vary the reduced turbidity of colors and improved color characteristics, and the variation or the like of a picture of a vivid color by means of the color keys cannot be effected in the same way as the conventional art. Accordingly, the present invention is particularly effective in setting the conditions for printing.

What is claimed is:
1. A method of determining exposures, comprising the step of:
    determining exposures of a first system and a second system by influencing a calculation for correcting an exposure of any one of three colors in either one of said two systems, said first system being such that a color mixture is present in the vicinity of at least one boundary of the three colors and is adapted to effect a calculation for correction of the exposures of the three colors respectively and independently, said second system being such that an amount of color mixture is less than that of said first system and is adapted to effect a calculation for correcting the exposures of the three colors respectively and independently.

2. A method of determining exposures according to claim 1, wherein said first system comprises at least either one of an exposure system in which a color mixture is present and a lightsensitive material in which a color mixture is present, and said second system comprises at lease either one of an exposure system in which an amount of color mixture is less than that of said exposure system of said first system and a lightsensitive material in which an amount of color mixture is less than that of said lightsensitive material of said first system, and wherein said second system differs from said first system.

3. A method of determining exposures according to claim 1, wherein said first system includes a first exposure system in which a color mixture is present in the vicinity of a boundary of the three colors and which is adapted to effect a calculation for correcting the exposures of the three colors respectively independently, said first system also including a lightsensitive material which is exposed by said first exposure system, while said second system includes a second exposure system in which an amount of color mixture is less than that of said first exposure system and which is adapted to effect a calculation for correcting the exposures of the three colors respectively and independently, said second system also including a lightsensitive material which is exposed by said second exposure system.

4. A method of determining exposures according to claim 1, wherein said first system includes a first exposure system for effecting a calculation for correcting the exposures of the three colors respectively and independently and a first lightsensitive material which is exposed by said first exposure system and in which the color mixture is present in the vicinity of at least one boundary of three layers sensitive to the three colors, while said second system includes a second exposure system for effecting a calculation for correcting the exposures of the three colors respectively and independently and a second lightsensitive material which is exposed by said first exposure system and in which an amount of color mixture in the vicinity of at least said one boundary of said three layers sensitive to the three colors is less than that of said first light sensitive material.

5. A method of determining exposures according to claim 3, wherein said first exposure system in which the color mixture is present is an exposure system of a white-light subtractive color printer, and said second exposure system in which the amount of color mixture is less that that of said first exposure system is an exposure system of an additive color printer.

6. A method of determining exposures according to claim 3, wherein said first exposure system is an exposure system of a white-light subtractive color printer, and said second exposure system is an exposure system of a white-light subtractive color printer on which improvements have been made so that an amount of color mixture of cut-filters becomes less that of former said white-light subtractive color printer.

7. A method of determining exposures according to claim 4, wherein said first lightsensitive material in which the color mixture is present is constituted by color paper in which a color mixture is present in blue-and-green-sensitive layers, and said second lightsensitive material in which the amount of color mixing is less than that of said first lightsensitive material is constituted by color paper on which improvements have been made so that an amount of color mixing between a blue-sensitive layer and a green-sensitive layer is less than that of said first lightsensitive material.

8. A method of determining exposures according to claim 1, wherein said first system and said second system are respectively provided with a plurality of data inputting keys for inputting data for correcting the density.

9. A method of determining exposures according to claim 8, wherein the calculation for correction with respect to a color corresponding to operation of one of said correction data inputting keys as well as a calculation for allowing the calculation for correction to influence the exposures of the other two colors are effected by performing a calculation for correcting the exposures of the three colors when said one of said correction data inputting keys has been operated.

10. A method of determining exposures according to claim 8, wherein said calculation for correction is effected by using either a predetermined value set in response to a value inputted by said data inputting key and a function.

11. A method of determining exposures according to claim 1, wherein the degree of influence of the calculation for correction on the exposures of the other colors is gradually varied at the time when the calculation for correction in either one of said systems influence on the exposures of the other colors in the same system.

12. A method of determining exposures according to claim 1, wherein when an operator who is accustomed to the operation of said first system uses said first system and said second system in conjunction, the calculation for correcting any one of the three colors in said second system is made to gradually influence the exposures of the other colors in said second system during an initial stage of use, but subsequently the degree of influence on the other colors is gradually reduced.

13. A method of determining exposures according to claim 1, wherein when an operator who is accustomed to the operation of said first system uses said first system and said second system in conjunction, the calculation for correcting any one of the three colors in said first system is made to gradually influence the exposures of the other colors in said first system during an initial stage of use, but subsequently the degree of influence on the other colors is gradually reduced.

14. A method of determining exposures, comprising the steps of:
storing, in an exposure calculating section of at least either one of a first system and a second system, a first operation expression for effecting a calculation for correcting only the exposure of a color corresponding to data inputted and a second operation expression for effecting a calculation for correcting the exposure of the color corresponding to the inputted data and a calculation for correcting the exposures of the other two colors, at a time when a determination is made of the exposures of three colors of said first system and said second system, said first system being such that a color mixture is present in the vicinity of at least one boundary of the three colors and being adapted to effect a calculation for correcting the exposures of the three colors respectively and independently, said second system being such that an amount of color mixture is less than that of said first system and being adapted to effect a calculation for correcting the exposures of the three colors respectively and independently; and selecting either said first operation expression or said second operation expression so as to determine exposures.

15. A method of determining exposures according to claim 14, wherein said first operation expression is selected when the exposures of the three colors are automatically corrected by an automatic exposure control function.

16. A method of determining exposures according to claim 14, wherein when an operator who is accustomed to the operation of said first system uses said first system and said second system in conjunction, said first operation expression is selected in said first system, and said second operation expression is selected in said second system.

17. A method of determining exposures according to claim 14, wherein when an operator who is accustomed to the operation of said first system uses said first system and said second system in conjunction, said first operation expression is selected in said first system and said second operation expression is selected in said second system, and when the operator who is accustomed to the operation of said first system has become accustomed to the operation of said second system, said first operation expression is selected in said second system as well.

18. A method of determining exposures according to claim 14, wherein either of both said first or second operation expressions is selected in accordance with a method of printing an image from a negative film to a photographic paper.

* * * * *